July 16, 1968 E. BONJOUR ET AL 3,392,570
DEVICE FOR THE THERMAL STUDY OF A SAMPLE
Filed April 22, 1964 3 Sheets-Sheet 1

INVENTORS
EMMANUEL BONJOUR
JACQUES PIERRE
BY
Bacon & Thomas
ATTORNEYS

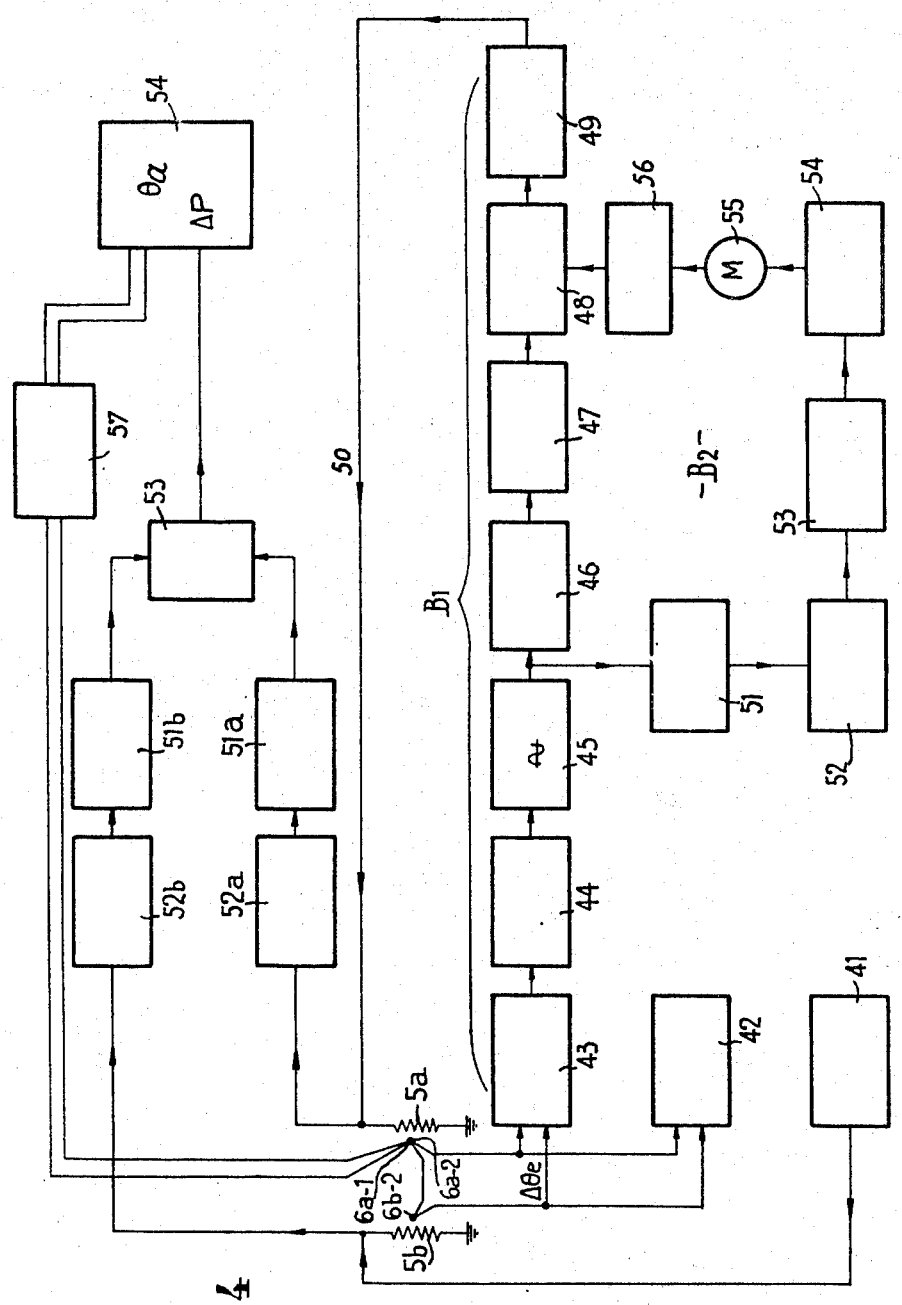

United States Patent Office 3,392,570
Patented July 16, 1968

3,392,570
DEVICE FOR THE THERMAL STUDY OF A SAMPLE
Emmanuel Bonjour and Jacques Pierre, Grenoble, France, assignors to Commissariat à l'Energie Atomique, Paris, France
Filed Apr. 22, 1964, Ser. No. 361,747
Claims priority, application France, Apr. 26, 1963, 932,883
3 Claims. (Cl. 73—15)

ABSTRACT OF THE DISCLOSURE

The present invention relates to an apparatus for measuring the internal energy released by a sample material as it undergoes an increase in temperature. Particularly the present invention relates to a calorimeter capable of use in differential thermal analysis of samples relating to a study of radiation damage in graphite or in studying the internal energy of material subjected to plastic deformation.

The present invention has for its object a device for measuring the energy which is released by a sample of material during the increase in temperature of said sample, the measurement being applicable especially, although not exclusively, to the study of radiation damage in graphite.

It is known to make use, especially for the determination of Wigner energy spectra, of devices comprising a calorimetric chamber which is intended to accommodate the sample to be studied and a reference sample, two electrical resistances which effect independently the heating of both samples, means for detecting a temperature difference between said samples, means controlled by said detection means for the purpose of regulating the power outputs supplied to the two samples in order to impose on these latter a thermal evolution which is identical in the course of time, means for measuring the temperature which is common to both samples and means for measuring the difference in power outputs supplied to each sample by means of the resistance-type heater elements.

The increase in temperature of the samples is preferably linear as a function of time. The difference in power outputs supplied to the two samples at each temperature level represents the internal energy which is liberated by the sample to be studied per unit of time.

In order to ensure high sensitivity of measurement, the temperature of the samples must be as uniform as possible at each instant. However, in devices of known types in which the resistance-type heater element is usually disposed in the interior of the sample, the sample itself has a cylindrical shape, with the result that uniformity of temperature can be defective when the temperature rise is rapid or when the thermal conductivity proper of the sample is low.

Furthermore, the temperatures which are attained by means of these devices cannot fall to any appreciable extent below 0° C., which precludes the possibility of studying radiation damage or of carrying out treatment at low temperature.

The primary object of the device in accordance with the invention is to improve the sensitivity of measurements by virtue of a special design of samples.

A further object of the device according to the invention is to extend the range of variation of temperature of the samples studied by lowering the minimum temperature to values in the vicinity of 77° K. and even 20° K. while retaining a maximum temperature of the order of 350 to 400° C.

The invention accordingly proposes a device for measuring the energy which is released by a sample of material during the increase in temperature of said sample, said device being intended especially for the purpose of studying radiation damage in graphite and comprising a calorimetric chamber designed to accommodate the sample to be studied and a reference sample, two electrical resistances which effect independently the heating of the two samples, means for detecting a temperature difference between said samples, means controlled by said detection means for the purpose of regulating the power supplied to the two samples in order to impose on these latter a thermal evolution which is identical in the course of time, means for measuring the temperature which is common to both samples and means for measuring the difference in power supplied to each sample through resistance-type heater elements, characterized in that said samples consist of two identical small plates of the material to be studied, said small plates being separated by the resistance-type heater element.

According to a particular form of embodiment, the device comprises a Dewar vessel which surrounds the calorimetric chamber and which is intended to contain a liquefied gas and means for conveying said liquefied gas either into the interior of the calorimeter chamber or bringing said gas in contact with the outer wall of said chamber.

The invention will be more readily understood by perusal of the following description which is given with reference to FIGS. 1 to 4 of the accompanying drawings and relates to a particular form of embodiment which is proposed by way of example only, without any limitation being implied.

In these drawings:

FIG. 4 is a portion of a synoptic circuit diagram of the device.

Figure 1:
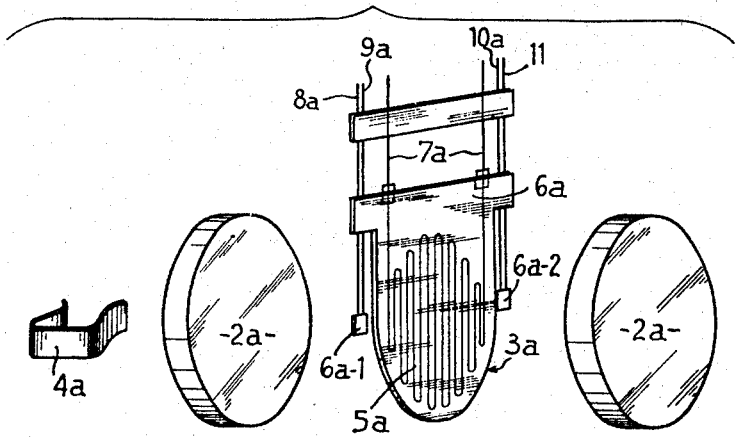
FIG. 1 is a view in perspective showing a sample of material to be heated, the element employed for heating said sample and an assembly element.
Figure 2:
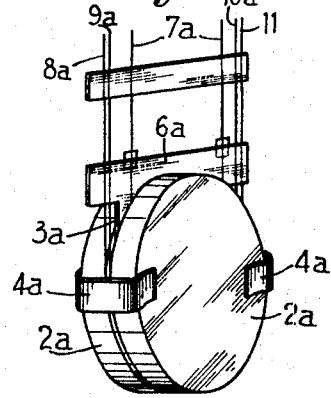
FIG. 2 is a view in perspective of the sample as assembled together with its heating element.
Figure 3:
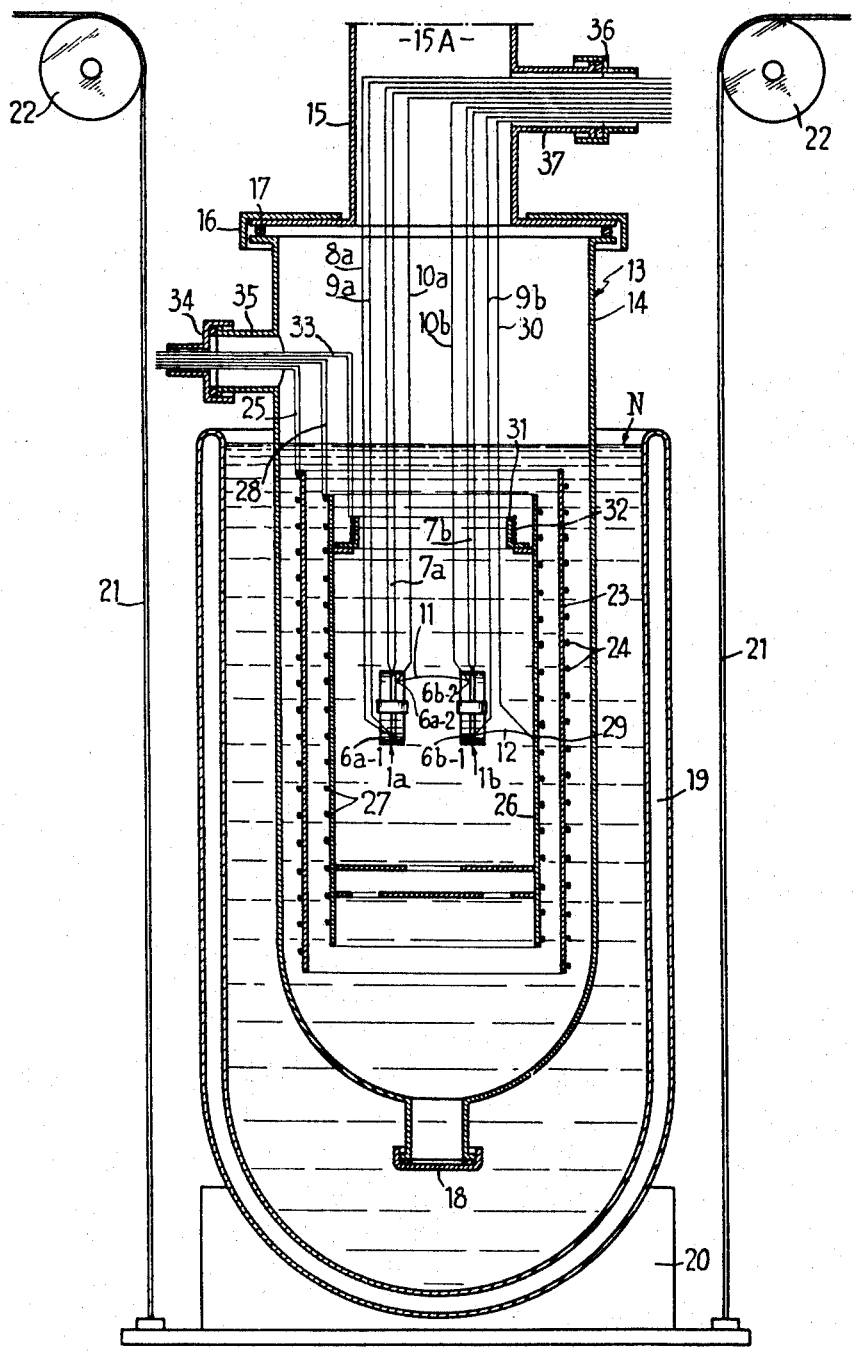
FIG. 3 is a sectional view of the calorimeter which constitutes one of the parts of the device according to the invention and which is fitted with its samples.

In accordance with the form of embodiment which is illustrated, the two samples 1a, 1b (as shown in FIG. 3) which are intended to be introduced in the measuring device are identical. Each sample comprises the various elements which are represented separately in FIG. 1 and which are shown assembled together in FIG. 2. For example, the sample 1a comprises two identical discs 2a, 2a which are cut from a rod of the material to be studied (graphite in the example chosen), an element 3a for heating and for temperature detection and two assembly clips 4a. The sample 1b which is identical with the sample 1a consists of the same components which are designated by the same reference numerals, the index a being replaced by the index b.

The dimensions of the discs 2a are chosen in such manner that said discs have a surface to volume ratio which is favorable to heat exchanges with the element 3a; for example, a diameter of 20 millimeters and a thickness of 2 millimeters are suitable for this purpose.

The heating and detection element 3a comprises a micro-resistance heater element which consists of a looped wire 5a of constantan which is maintained in position by glueing between two thin mica foils 6a, the surface area of which covers that of the discs almost entirely. Two welded measuring thermocouples 6a–1, 6a–2 of Chromel-constantan alloy and 0.08 millimeter in diameter are mounted on each side of the resistor 5a, also between mica foils.

In one example of embodiment, the resistors 5a and 5b have a resistance of 600 ohms.

The ends of the resistors 5a and 5b are connected respectively to two pairs of conductors 7a and 7b. The thermocouple 6a–1 is provided with two outlet conductors 8a, 9a; the thermocouple 6a–2 comprises an outlet conductor 10a and a connecting conductor 11 which joins the thermocouples 6a–2 and 6b–2 together (as shown in FIG. 3). The thermocouple 6b–2 is provided with an outlet conductor 10b and the connecting wire 11. The thermocouple 6b–1 is provided with an outlet conductor 9b and a connecting conductor 12 which is intended to join said thermocouple to a fifth thermocouple, as will be explained in detail below.

The measuring device comprises a calorimetric unit as illustrated in FIG. 3. The metallic chamber 13 consists of a shell 14 and a cap 15 fitted with a connector-pipe 15A which can be connected to an installation for creating a secondary vacuum within said chamber. The cap 15 can be fixed on the shell by means of a demountable flange 16, leak-tightness being ensured by means of a sealing joint 17. The shell 14 is provided at the bottom portion thereof with an opening which is closed by a drain plug 18.

The combined assembly is fixed at the top portion thereof to a stationary support (which has not been shown in the drawings). A double-walled vacuum vessel 19 of the Dewar type which is supported on a base 20 can be brought beneath the metallic chamber 13 and lifted around said chamber until a suitable height is reached by means of a lifting and lowering device of suitable type. The said lifting and lowering device is represented diagrammatically by cables 21 which are secured to the base 20 and which pass over pulleys 22, said pulleys being rotatably mounted on stationary shafts.

The measuring calorimeter proper is placed within the metallic chamber 13 and consists of:

A main screen or "outer" screen 23 of cylindrical configuration, said screen being fitted with a resistance coil 24 which is supplied with current by a pair of conductors 25 so as to carry out a power programming of said screen with regulation of the temperature;

A secondary screen or "inner" screen 26 having a lower thermal inertia than the screen 23 and provided with a resistance coil 27 which is supplied through a pair of conductors 28;

The samples 1a, 1b which are mounted, assembled together and connected in the manner which has been described above;

A fifth thermocouple 29 comprising an outlet conductor 30 and which is joined to the thermocouple 6b–1 by means of the connecting conductor 12. Said thermocouple 29 is mounted against the wall of the cylindrical screen 26;

A holding plate 31 in which are confined the lead-wires for supplying the resistance heater elements and the thermocouple leads which also serve as suspension wires for these latter. The said holding plate is fitted with an auxiliary coil 32 which is supplied with current through a pair of conductors 33.

The conductors 25, 28 and 33 to the resistance coils 24, 27 and 32 of the screens 23 and 26 and of the holding plate 31 pass through vacuum-tight seals in a plate 34 which closes in leak-tight manner a lead-in bushing 35 of the shell 14. The conductors to the resistance elements 5a and 5b of the samples and the conductors to the thermocouples pass through sealing joints in a plate 36 which closes in leak-tight manner a lead-in bushing 37 of the cap 15.

It will be understood in the following description that the sample 1a is irradiated in the cold state and that the sample 1b is the reference sample. The mode of assembly of these samples ensures good thermal coupling between the heater element and the samples, thereby producing favorable conditions for a more uniform distribution of the thermal flux within these latter. This feature is all the more important as graphite has relatively low and very anisotropic thermal conductivity, the variations of which after irradiation and during annealing can be very considerable.

As will be apparent, the following thermocouples are provided:

A thermocouple 6a–1 which is responsive to the absolute value of the temperature of the irradiated sample 1a;

A differential thermocouple 6a–2, 6b–2 which is responsive to the difference in temperature of the samples 1a and 1b;

A differential thermocouple 6b–1, 29 which is responsive to the difference in temperatures of the sample 1b and of the inner screen 26;

The conductors of these thermocouples are accessible from the exterior of the measuring chamber 13.

The measuring unit provided by this invention additionally comprises measuring instruments and an electronic control device which will be mentioned or briefly described hereinafter.

The method of operation is as follows:

The irradiated sample 1a is positioned within a separate vessel over the corresponding heating element 3a. Each sample assembly comprising the resistor 5 and discs 2 is formed by rigidly securing these latter by means of assembly clamps 4. This handling operation is performed in liquid nitrogen.

The Dewar vessel which is partially filled with liquid nitrogen is then lifted in such a manner as to bring up to N the level of this liquid within the chamber 13 of the calorimeter and the combined assembly which consists in samples and a support member which is integral with the cap 15 is then transferred to place said samples within the inner secondary screen 26. This operation must be carried out rapidly so as to ensure that the samples are not heated during the positioning thereof within the device and that the measurements can be taken starting from the temperature of liquid nitrogen.

The chamber is then drained off through the bottom opening after lowering the Dewar vessel, whereupon the level of liquid nitrogen is restored outside said chamber by replacing cap 18 and then lifting the Dewar vessel.

The creation of a suitable vacuum is relatively slow by reason of the extensive degassing which is necessary in the chamber and samples. Pumping of the nitrogen which is occluded in the porosity of said samples produces a sharp reduction in temperature to below 78° K. Preliminary degassing can accordingly be continued without any danger of heating the samples. When the samples are restored to temperature equilibrium with the screen 26 at 78° K., the necessary power outputs can be applied for the purpose of carrying out the annealing program and taking the necessary measurements and recordings.

To this end, there is recorded continuously and simultaneously on a two-track recorder having a sensitivity of 1 mv.:

(1) The difference $\Delta P$ between the power outputs supplied:

On the one hand to the reference sample 1b for the purpose of causing said sample to follow a predetermined heating programme, On the other hand to the irradiated sample 1a, the thermal evolution of which is strictly controlled in dependence on the preceding by means of the first differential thermocouple 6a2–6b2 which measures the difference $\Delta\theta_e$ in temperatures.

(2) The absolute temperature $\theta_a$ of the sample 1a as detected by the thermocouple 6a–1.

These operations are carried out in the following manner.

PROGRAMMING

The heating programming (refer to FIG. 4) is carried out on the resistance 5b of the reference element by means of a programming unit 41 consisting in particular of a variable-current generator which permits of a predetermined temperature increase, for example a linear increase of 2° C. per minute.

The starting power can be set at will at a certain value which is comprised, for example, between 1 mw. and 200 mw. This device is so arranged as to obtain good linearity of the continuous temperature increase, to permit of indication of the initial power and to permit the possibility of stopping the program at will.

CONTROL OF THE SAMPLES

The error signal which is supplied by the differential thermocouple 10a, 11, 10b is checked by means of a galvanometer 42 and processed by a first loop B1 or so-called "rapid loop" in which the signal is filtered at 43, clipped by a mechanical chopper 44 to a low frequency (94 cycles per second, for example), amplified in alternating current by an amplifier 45, demodulated in direct current at 46, filtered through a variable-gain filter 47, amplified in direct current at 48 and power-amplified at 49. This error signal which is thus amplified controls through the conductor 50 the supply of current to the micro-resistance 5a of the irradiated element, thereby controlling the temperature of the element 1a in dependence on the temperature of the element 1b.

A loop B2 or so-called "slow loop" permits the possibility of making corrections for slow drift and to set the initial zero in a correct manner.

The said loop B2 consists of a demodulator 51, a variable-gain filter 52, an amplifier 53 in which the signal is amplified in direct current, a power amplifier 54 which controls the rotation of an integrator motor 55 which, through the intermediary of a ½₀₀₀ speed-reducer 56 produces action on a potentiometer which is connected between the amplifiers 47 and 48. By means of a potentiometer which is disposed at the output end of the amplifier 53, the motor 55 can be caused to rotate either in one direction or in the other and action can consequently be produced on the potentiometer which is actuated by the speed reducer so that the difference in temperature between the samples 1a and 1b can thus be set at zero, the regulation being subsequently carried out around this point.

MEASUREMENT OF $\Delta P$

Since the two resistances 5a, 5b for heating the samples are of equal value, the difference $\Delta P$ between the power outputs Pa and Pb which are dissipated in said two resistances respectively is evidently proportional to the difference between the squares of the intensities of the currents which pass through these resistances, that is to say to the difference between the voltages supplied by the thermocouples whose indication is proportional to the squares of the intensities of the heating currents of said resistances 5a and 5b.

The measurement of $\Delta P$ is therefore effected by means of a static wattmeter comprising two thermocouples 51a and 51b which are mounted through the intermediary of adaptors 52a, 52b and which supply through the intermediary of an attenuator 53 a first track of a recording instrument 54 which provides a direct and linear recording of $\Delta P$. Calibration gives, for example, the correspondence of 50 mw. for 1 mv.

MEASUREMENT OF THE ABSOLUTE TEMPERATURE $\theta$ OF THE SAMPLE

This measurement, which is supplied by the thermocouple 6a–1, is recorded in synchronism with the measurement of $\Delta P$ on a second track of the recording instrument. To this end, the corresponding voltage which can vary, for example between −9 mv. and +14 mv. is divided into steps of 1 mv. by means of an automatic origin-displacement system 57.

There is thus obtained a curve of variations of the temperature $\theta$ as a function of the time $t$; the said curve, in the particular case considered of a linear temperature rise, is a straight line having a slope $p$.

If $m$ is the mass of the sample, it is possible at each moment, knowing $\Delta P(t)$ and $\theta(t)$, to calculate the internal energy which is released per gram of material and per thermometric degree $dH/d\theta$:

$$\frac{dH}{d\theta} = \frac{dH}{dt} \times \frac{dt}{d\theta} = \frac{\Delta P}{m} \times \frac{1}{p}$$

The calculation can be made from the two curves recorded but the results can also be supplied directly by an electronic computer which is incorporated in the recording instrument.

CONTROL OF INNER SCREEN-SAMPLES

The regulation of the temperature of the inner screen is carried out by a loop (which has not been shown in the drawings) and which is identical with the sample control loop but does not have slow drift compensation. It is nevertheless possible to effect a zero adjustment if necessary or also to adjust the difference in temperatures to a value other than zero for the purpose of creating a level of controlled losses (case in which the differential enthalpy were to exceed the value of the specific heat at the corresponding temperature).

During the various measuring operations which have been described in the foregoing, the realization of strictly adiabatic conditions is not essential but does govern the sensitivity of response of the differential thermocouple which delivers the error signal of the control chain.

These conditions are ensured in the calorimeter:

By the very fine regulation of the inner screen 26 with respect to the temperature of the samples, thus preventing radiation losses, By the maintenance of a high vacuum of the order of $5.10^{-6}$ millimeters of mercury.

By minimizing losses in the supply leads by means of the holding plate 31 which is well coupled to the screen from a thermal point of view but which is nevertheless fitted with the compensation winding 32, the adjustable voltage feed to said winding being intended to vary during annealing with the voltage feed to the inner screen 26 since the holding plate is supplied in parallel.

The process and apparatus in accordance with the invention as applicable to graphite serves to obtain measurements having a maximum relative error calculated on a point which is less than 1.5% in determinations of differential enthalpy which can vary between 50 and 100 millicalories per degree and per gram. Even better results would be obtained in the case of metals having more favorable characteristics.

The invention is not limited to the form of embodiment which has been illustrated and described or to the application of the invention to graphite alone, said form of embodiment and said application having been chosen solely by way of example. In particular, this process and this device can be employed in metallurgy for the purpose of measuring internal energy in metals which are subjected to cold work by plastic deformation or to any other mode of creation of defects.

What we claim is:

1. Apparatus for measuring the energy released by a sample of a material as it is subjected to an increase in temperature comprising:
    a calorimeter chamber including a removable cap member from which a reference assembly and a reference sample assembly are internally suspended within said chamber in spaced adjacent relationship by means of electrical wires,
    said sample assembly including a micro-resistance heater element of looped wire fixedly enclosed, along with two thermocouples mounted adjacent opposite edges of said heater element, between two thin mica sheets, and an identical disc of sample material held tightly against each outer side of said mica sheets by clamping means, said discs of sample material having a diameter substantially equal to that of said heater element and otherwise having dimensions which provide a high surface to volume ratio enabling effective heat exchange with said heater element, said reference sample assembly being substantially identical to said sample assembly except that said reference sample assembly includes discs of a reference material rather than sample material, means for independently supplying electrical power to said heater elements in order to heat said sample and reference discs, means for measuring a temperature difference between said sample discs and said reference discs, means controlled in response to said measurement for regulating the power supplied in order to impose upon said sample and reference discs a thermal evolution which is identical over a period of time, means for measuring the temperature common to said sample discs and said reference discs, and means for measuring the difference in power supplied to said sample discs and said reference discs.

2. Apparatus as described in claim 1 further including a Dewar vessel, adapted to contain a liquefied gas, removably surrounding said calorimetric chamber, and means for selectively conveying liquefied gas into the interior of said chamber and into contact with outer walls of said chamber.

3. Apparatus as described in claim 2 further including:

means for creating a vacuum within said calorimeter chamber, a peripheral screen within said chamber, means for heating said screen, and means for regulating the temperature of said screen in response to the temperature of said sample discs and said reference discs.

References Cited

UNITED STATES PATENTS 3,263,484   8/1966   Watson et al. _____ 73—15

OTHER REFERENCES

Clarebrough, L. M. et al.: "The Determination of the Energy Stored in Metal During Plastic Deformation." In Proceedings of the Royal Society of London A215, pp. 507–517, November-December 1962, Q41.L8.

Bullock, G.: "Calorimeter with Automatic Control." In Journal of Scientific Instruments, 36(1): pp. 20–22, January 1959, copy in 73/190.

Holland, M. G. et al.: "Apparatus for the Measurement of Thermal Conductivity in the Range 1.7 to 300° K." In Review of Scientific Instruments 33(9): pp. 923–928, September 1962.

JAMES J. GILL, *Primary Examiner.*

E. E. SCOTT, *Assistant Examiner.*